US011727283B2

United States Patent
Dickens et al.

(10) Patent No.: US 11,727,283 B2
(45) Date of Patent: Aug. 15, 2023

(54) RULE DISTRIBUTION ACROSS INSTANCES OF RULES ENGINE

(71) Applicant: International Business Machines Corporation, Armonk, NY (US)

(72) Inventors: Rachael Marie Huston Dickens, Raleigh, NC (US); Kelley Gordon, Apex, NC (US); Uwe Karl Hansmann, Tuebingen (DE); Dieter Buehler, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 16/877,664

(22) Filed: May 19, 2020

(65) Prior Publication Data

US 2021/0365801 A1    Nov. 25, 2021

(51) Int. Cl.
*G06N 5/025* (2023.01)
*H04L 67/10* (2022.01)
*G06F 9/50* (2006.01)

(52) U.S. Cl.
CPC ........... *G06N 5/025* (2013.01); *G06F 9/5005* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 5,136,523 A | 8/1992 | Landers | |
| 7,565,642 B2 | 7/2009 | Moore et al. | |
| 7,958,077 B2 * | 6/2011 | Vescovi | G06Q 10/10 |
| | | | 719/314 |
| 8,238,873 B2 | 8/2012 | Wu | |
| 8,453,159 B2 * | 5/2013 | Appelbaum | G06F 16/24565 |
| | | | 709/229 |
| 8,918,866 B2 * | 12/2014 | Luo | H04L 63/1441 |
| | | | 726/22 |
| 9,270,743 B2 | 2/2016 | Frenkel | |
| 2001/0056422 A1 * | 12/2001 | Benedict, Jr. | H04L 67/567 |
| | | | 705/320 |

(Continued)

FOREIGN PATENT DOCUMENTS

WO    2018115616 A1    6/2018
WO    2019068002 A1    4/2019

OTHER PUBLICATIONS

International Search Report, International Application No. PCT/IB2021/053230, dated Jul. 8, 2021, 8 pgs.

(Continued)

*Primary Examiner* — Gregory B Sefcheck
(74) *Attorney, Agent, or Firm* — Kelli D. Morin

(57) ABSTRACT

Provided is a method for distributing rules across instances of a rules engine. The method includes determining a rule load for each set of rules of a plurality of sets of rules. Each set of rules is associated with a tenant of a plurality of tenants hosted on a multi-tenant system. The method includes combining the rule load for each set of rules into an overall rule load. The method further includes distributing the sets of rules across a set of rules engine instances such that approximately the same fraction of the overall rule load is assigned to each rules engine instance of the set of rules engine instances.

20 Claims, 8 Drawing Sheets

(56) References Cited

U.S. PATENT DOCUMENTS

| | | | |
|---|---|---|---|
| 2008/0177690 A1* | 7/2008 | Vescovi | G06Q 10/10 |
| | | | 706/48 |
| 2009/0271412 A1* | 10/2009 | Lacapra | G06F 16/178 |
| 2009/0299939 A1* | 12/2009 | Jung | G06N 5/025 |
| | | | 706/47 |
| 2010/0333167 A1* | 12/2010 | Luo | H04L 63/1441 |
| | | | 706/14 |
| 2014/0040177 A1 | 2/2014 | Sherman et al. | |
| 2014/0278812 A1 | 9/2014 | Reinhold et al. | |
| 2015/0127736 A1 | 5/2015 | Clinton et al. | |
| 2015/0150011 A1 | 5/2015 | Fischetti et al. | |
| 2015/0254558 A1* | 9/2015 | Arnold | G06Q 30/0201 |
| | | | 700/19 |
| 2017/0169071 A1 | 6/2017 | Petri et al. | |
| 2017/0208487 A1* | 7/2017 | Ratakonda | H04L 43/55 |
| 2019/0149525 A1 | 5/2019 | Gunda et al. | |
| 2019/0297096 A1 | 9/2019 | Ahmed et al. | |
| 2019/0342178 A1* | 11/2019 | Balasubramanian | G06N 5/00 |
| 2020/0211027 A1* | 7/2020 | Sharifi | G06F 9/541 |
| 2021/0240712 A1* | 8/2021 | Oscherov | G06F 16/24568 |

OTHER PUBLICATIONS

Drools, "Business Rules Manager System (Java™, Open Source)," www.drools.org, printed Mar. 20, 2020, 3 pgs.

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

RULE DISTRIBUTION ACROSS INSTANCES OF RULES ENGINE

BACKGROUND

The present disclosure relates generally to the field of rules services, and more particularly to distribution of the execution of rules across multiple independent instances of a rules engine.

Modern rules engines hold in-memory models of rule sets to facilitate fast evaluation of rules. In a modern micro service environment, the rules service typically deploys multiple instances of a rules engine simultaneously to further facilitate fast evaluation of rules.

SUMMARY

Embodiments of the present disclosure include a method, computer program product, and system for distributing rules across independent instances of a rules engine. The method comprises determining a rule load for each set of rules of a plurality of sets of rules. Each set of rules is associated with a tenant of a plurality of tenants hosted on a multi-tenant system. The method further comprises combining the rule loads into an overall rule load. The method further comprises distributing the plurality of sets of rules across a set of rules engine instances such that approximately the same fraction of the overall rule load is assigned to each rules engine instance of the set of rules engine instances.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
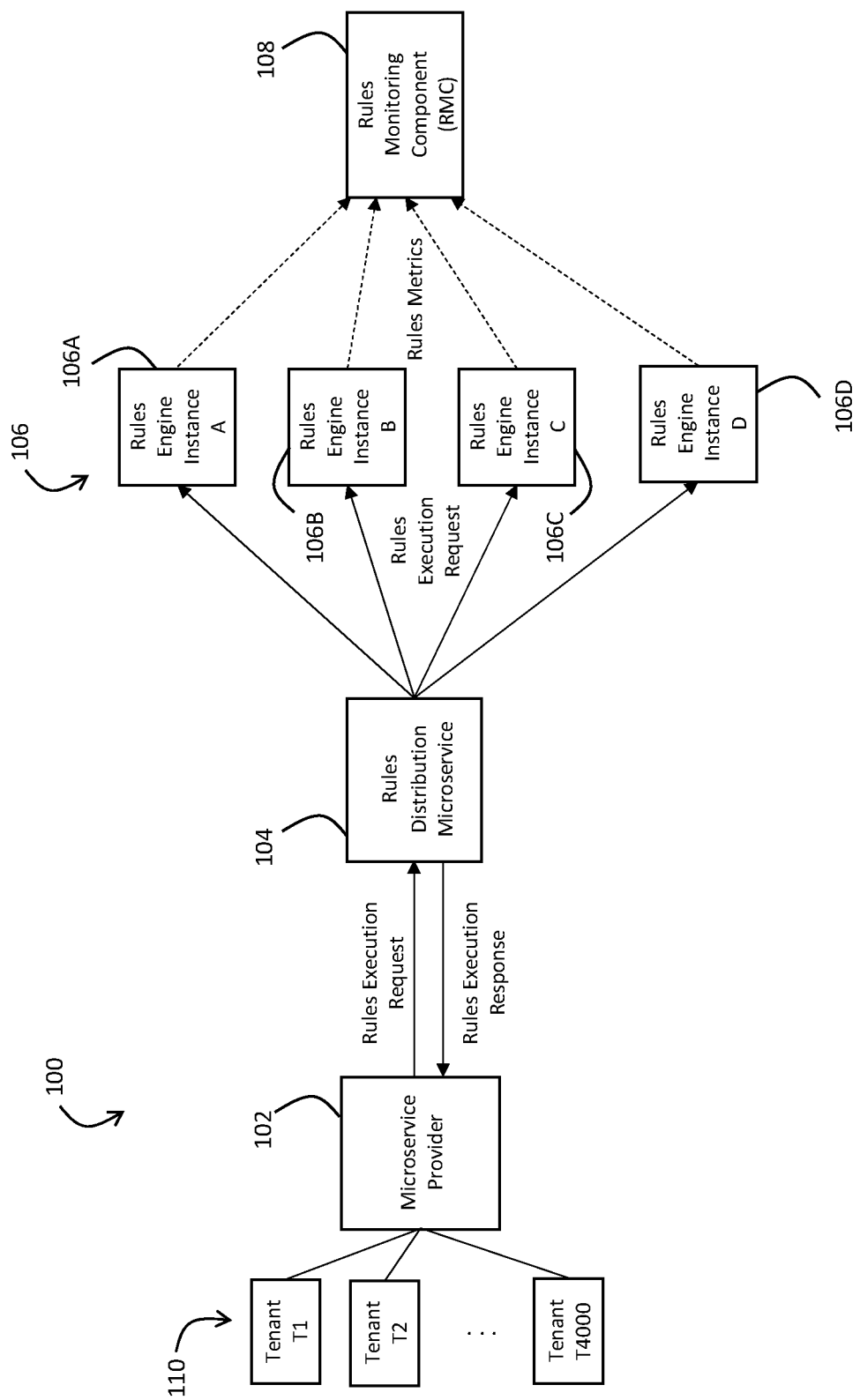
FIG. 1 illustrates a block diagram of an example rules execution system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of rules services, and in particular to distributing the execution of rules across independent instances of a rules engine. While the present disclosure is not necessarily limited to such applications, various aspects of the disclosure may be appreciated through a discussion of various examples using this context.

Rules engines can be used to process numerous types of requests and return appropriate responses. Rules engines may utilize a set of rules, each of which has a condition and associated action, to process data and generate (or filter) results (e.g., select an action based on the processed data). For example, rules engines may be used as part of search engine. The search engine carries out a requested search for particular information in a systematic manner. The results of the search are then returned to the requester. How the results of the search are presented, for example, in what order, is managed by a rules engine. More specifically, a rules engine applies a set or sets of rules to the results to determine the manner in which the results are presented to the requester. The set or sets of rules differ depending on the objectives of the entity that generates the rules.

For example, in the case of an online retailer, it may be advantageous to the retailer to promote a particular item for one of a number of reasons. For example, the item may have a limited shelf-life, and the retailer may need to sell more of that item before it expires. Additionally, or alternatively, the retailer may receive a particular benefit for selling items from a particular supplier, and therefore be incentivized to sell more items from that supplier. Additionally, or alternatively, the retailer may want to sell more of a particular item to make room for a new or different item. In each of these example circumstances, as well as many others, it is advantageous to the retailer to be able to exert some control over how the list of search results is presented to the consumer. For example, the retailer may have the search results modified such that a particular item is highlighted, shown first, or otherwise brought more readily to the consumer's attention. The retailer may exert such control via a set or sets of rules which a rules engine applies to the results of the consumer's search.

In a microservice environment, various services, also referred to herein as microservices, are provided by a microservice provider to a tenant. A tenant may be, for example, an online retailer. Microservices to be provided to the tenant may be, for example, retrieval of search results or application of sets of rules. It is common for microservice providers to operate multi-tenant systems, wherein a single microservice provider provides microservices to a plurality of tenants. Such microservice providers may provide such services to tenants via, for example, a shared cloud system.

In the present disclosure, the microservice provider provides the service of applying sets of rules to search results. Accordingly, the microservice provider maintains a rules execution microservice, which executes rules for tenants upon request. Each tenant in the multi-tenant system can have their own rules or sets of rules, which are provided to the microservice provider to be applied during the microservice provider's execution of the requested microservice. Each set of rules is stored in a memory of the microservice provider so that the microservice provider is able to quickly recall and apply a set of rules for a tenant upon request. Typically, to speed up the process of recalling and applying different sets of rules for different tenants in the multi-tenant system, the microservice provider runs multiple instances of a rules engine simultaneously, in parallel. Currently, each instance of a rules engine includes all of the rules for all of the tenants. This way, when multiple requests from tenants come in at or around the same time, different requests can be sent to different instances of the rules engine to distribute the request load and return responses to the tenants as quickly as possible.

One drawback of this current system, however, is the high number of copies of the same rules that have to be stored in multiple locations. More specifically, if a multi-tenant microservice provider has 5,000 tenants, and each tenant has an average of 100 rules to be applied, then 100 rules for 5,000 tenants have to be loaded for every instance of the rules engine of the microservice provider. In other words, 500,000 rules have to be loaded for every instance of the rules engine. At some point, the number of rules becomes high enough that the costs, for example, memory consumption, incurred by the system of loading so many rules outweigh the benefits provided by loading a copy of each rule for each tenant on each instance of the rules engine.

One way to manage the number of rules is to divide the tenants evenly among the instances and only load the rules for the tenants assigned to each instance on that respective instance. For example, tenants 1-100 could be assigned to instance A of the rules engine, tenants 101-200 could be assigned to instance B of the rules engine, and tenants 201-300 could be assigned to instance C of the rules engine. Then instance A only stores and applies the rules associated with tenants 1-100, instance B only stores and applies the rules associated with tenants 101-200, and instance C only stores and applies the rules associated with tenants 201-300. Accordingly, a rules distribution microservice distributes requests from the microservice provider such that any incoming request from any one of tenants 1-100 is routed to instance A, any incoming request from any one of tenants 101-200 is routed to instance B, and any incoming request from any one of tenants 201-300 is routed to instance C.

However, the execution of all rules does not require the same amount of resources. For example, executing rule sets for some tenants may incur greater actual runtime or load costs than executing rule sets for other tenants. Accordingly, distributing the number of tenants evenly across instances of the rules engine does not necessarily distribute the collective burden or load of all of the tenants evenly across instances of the rules engine. Therefore, dividing tenants evenly among instances may not be the most efficient or effective way to optimize the functionality and resources of the microservice provider.

Embodiments of the present disclosure may overcome the above, and other, problems by distributing the execution of rules across independent instances of a rules engine based on the load generated by each tenant. Accordingly, the microservice provider also maintains a rules distribution microservice, which distributes the rules, as explained in further detail herein. The load generated by an associated tenant is also referred to herein as the "rule load" generated by that specific tenant. The rule load is determined for each tenant by an algorithm, which takes into account factors including, but not limited to: a number of rule evaluation requests by the tenant in a given time period; an average number of rule condition checks performed by the rules engine per request in the given time period; an average number of actions triggered by the rules engine per request in the given time period; the average rule evaluation context size per request in the given time period; a number of condition facts defined per tenant; and a complexity configuration value.

Once the rule load for each tenant is known, the rule load for all tenants can be combined into an overall rules load. The tenants are then distributed on the instances of the rules engine such that each instance handles approximately the same fraction of the overall rules load. In other words, the tenants are distributed on the instances in a manner which distributes the cumulative rules loads of all the tenants as evenly as possible. In this way, the functionality and resources of the microservice provider are more efficiently and effectively optimized.

It is to be understood that the aforementioned advantages are example advantages and should not be construed as limiting. Embodiments of the present disclosure can contain all, some, or none of the aforementioned advantages while remaining within the spirit and scope of the present disclosure. Furthermore, while the present disclosure details application of various embodiments in the context of search engines, it is to be understood that embodiments may be directed to other applications of rules engines, and the example embodiments disclosed herein are not to be construed as limiting.

Turning now to the figures, FIG. 1 illustrates a block diagram of an example rules execution system 100, in accordance with embodiments of the present disclosure. The example rules execution system 100 includes a microservice provider 102, a rules distribution microservice 104, a plurality of rules engine instances 106A, 106B, 106C, and 106D (collectively referred to as rules engine instances 106), a rules monitoring component 108, and a plurality of tenants T(n) (collectively referred to as tenants 110). In at least one embodiment of the present disclosure, the microservice provider 102 includes the rules distribution microservice 104. However, in other embodiments of the present disclosure, the microservice provider 102 and the rules distribution microservice 104 are separate and distinct components of the system 100.

It is noted that FIG. 1 is intended to depict the representative major components of an exemplary rules execution system 100. In some embodiments, however, individual components may have greater or lesser complexity than as represented in FIG. 1, components other than or in addition to those shown in FIG. 1 may be present, and the number, type, and configuration of such components may vary. For example, while FIG. 1 illustrates a rules execution system 100 with four rules engine instances 106, suitable computing environments for implementing embodiments of this disclosure may include any number of rules engine instances. Additionally, the various models, modules, systems, and components illustrated in FIG. 1 may exist, if at all, across a plurality of host devices and remote devices.

In some embodiments, the rules execution system 100 can be implemented within a cloud computing environment or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over a network.

In accordance with embodiments of the present disclosure, the microservice provider 102 provides microservices to a plurality of tenants. For the purpose of illustration, in the example embodiment shown in FIG. 1, the microservice provider 102 provides microservices to 4,000 tenants (shown in FIG. 1 as tenant T1, tenant T2 ... tenant T4000), collectively referred to as tenants 110. In alternative embodiments, the microservice provider 102 can provide microservices to more or fewer than 4,000 tenants. In the rules execution system 100 discussed herein, the microservice provider 102 acts at least in part as a rules engine, providing rules execution services to each tenant 110. Accordingly, the microservice provider 102 is provided with a set of tenant-specific rules from each of the tenants 110. Each set of tenant-specific rules may have a different number of rules and/or may require a different quantity of resources for execution of those rules.

To improve efficiency in responding to rules execution requests received from the tenants 110, the rules provided to the microservice provider 102 are distributed across the rules engine instances 106. Each of the rules engine instances 106 is a copy of at least a portion of the rules engine that is capable of storing, loading, and executing rules upon receipt of a rules execution request from a tenant. Distribution of the rules is managed by the rules distribution microservice 104. In particular, the rules are distributed in such a manner that all of the rules of a set of tenant-specific rules associated with a particular tenant 110 are assigned to a single rules engine instance 106. Each rules engine instance 106 is responsible for storing, loading, and executing the rules that it has been assigned.

In accordance with embodiments of the present disclosure, each rules engine instance 106 is assigned a subset of the sets of rules, rather than each rules engine instance 106 being assigned all of the rules. In particular, each rules engine instance 106 is assigned sets of rules that pertain to a subset of the tenants 110, rather than each rules engine instance 106 being assigned the sets of rules for all of the tenants 110.

Figure 2:
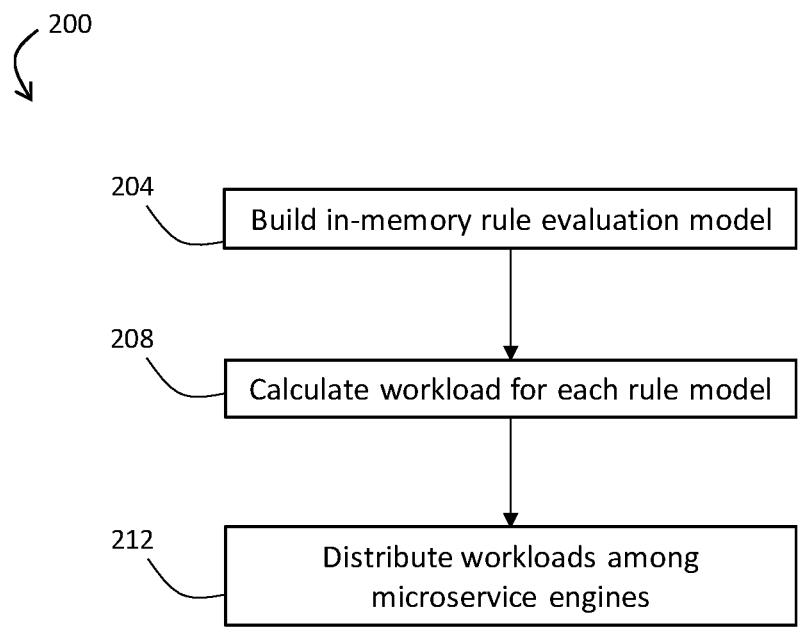
FIG. 2 illustrates a flowchart of an example method for assigning rules to rules engine instances, in accordance with embodiments of the present disclosure.

More specifically, and with reference to FIG. 2, how the sets of rules are assigned to the rules engine instances 106 is managed by a method 200. First, at operation 204, an in-memory rule evaluation model is generated for each tenant 110. The in-memory rule evaluation model may also be referred to herein as a rule evaluation model, an in-memory model, or a rule model. In at least one embodiment of the present disclosure, the rule models are generated by the rules distribution microservice 104. In at least some embodiments of the present disclosure, each rule model specifies how the set of rules is applied to a provided set of data.

At operation 208, a workload is calculated for each rule model. Because a rule model is generated for each tenant 110, the workload that is calculated for a rule model is also the workload of the associated tenant. The workload represents the effect or burden that executing the rule model has on the microservice engine. In this case, the microservice engine is a rules engine. The workload for each rule model is calculated based on a number of aspects of the rule model, such as the number of rules in the rule model, the number and complexity of conditions associated with each rule, the average expected number of rule evaluation requests, and the complexity of the rule evaluation context.

In accordance with at least one embodiment of the present disclosure, the particular algorithm for calculating the workload of a rule model is as follows:

$$W(T)=r(t)*c(t)*a(t)*(x+s(t)/f).$$

In the algorithm, the variable $W(T)$ represents the workload of a tenant. The variable $r(t)$ represents a number of rule evaluation requests received by the rules engine from the tenant in a given time period $(t)$. In accordance with at least one embodiment of the present disclosure, the given time period $(t)$ can be, for example, two minutes. The variable $c(t)$ represents an average number of rule conditions to be considered by the rules engine to answer those requests. The variable $a(t)$ represents an average number of actions triggered by the rules engine to answer those requests in the given time period $(t)$. The variable $s(t)$ represents the average rule evaluation context size of those requests in the given time period. In accordance with at least one embodiment of the present disclosure, the evaluation context can be, for example, fact values. Accordingly, the average rule evaluation context size per request can be, for example, a number of fact values passed to the rule evaluation request in the given time period $(t)$. The variable $f$ represents the number of condition facts defined by the tenant. In accordance with at least one embodiment of the present disclosure, condition facts can include, without limitation, for example, user-segment, geo-location, referrer, client-device-type, gender, or age. The variable $x$ represents a complexity configuration value, which can be used for tuning the workload. In accordance with at least one embodiment of the present disclosure, a default value of the variable $x$ is one.

In accordance with at least one embodiment of the present disclosure, the rules monitoring component 108 is a tracking component, which measures the rule load generated by a specific tenant on the rules engine. Accordingly, when the microservice system 100 is operated, the rules monitoring component 108 receives data pertaining to: the number of rule evaluation requests per tenant in a given time period; an average number of rule conditions checks performed per request in the given time period; an average number of actions triggered per request in the given time period; an average rule evaluation context size per request in the given time period; and/or a number of condition facts defined per tenant.

Once the workload of each rule model has been determined, the method 200 proceeds with operation 212, wherein those workloads are used to distribute the rule models among a set of orchestrated microservice engines (such as, for example, rules engine instances 106), to optimize the functionality and resources of the microservice provider. More specifically, the calculated workloads for all of the tenants 110 are considered to generate an in-memory rules engine distribution model. Based on the in-memory rules engine distribution model, the rule sets are distributed across rules engine instances 106 in a manner such that the workloads of all of the tenants 110 are distributed as evenly as possible across the rules engine instances 106. In other words, the number of tenants 110, or associated rules sets, assigned to each rules engine instance 106 may vary, but the workload assigned to each rules engine instance 106 is as equal as possible. Accordingly, each rules engine instance 106 is handling approximately the same fraction of the overall workload. Therefore, the available system resources are optimized by being spread out as evenly as possible across the rules engine instances 106.

For example, performance of the method 200 may result in the assignment of the rules for tenants T1-T30 and tenants T700-T2000 to rules engine instance A 106A, the assignment of the rules for tenants T31-T699 and tenants T2001-T2500 to rules engine instance B 106B, the assignment of the rules for tenants T2501-T3225 and tenants T3900-T4000 to rules engine instance C 106C, and the assignment of the rules for tenants T3226-T3899 to rules engine instance D 106D.

It is noted that the above is an example distribution. Other distributions based on other factors (such as user settings, relative processing power of nodes hosting various engines, etc.), are also possible. For example, in at least some embodiments of the present disclosure, the distribution of the rule models can be determined based on the resources available to and/or the capabilities of individual rules engine instances. For example, a particular rules engine instance may be on a server that has more memory. Accordingly, this particular rules engine instance may have access to greater memory resources than other rules engine instances. As such, it may be advantageous to distribute the rule models such that a greater fraction is handled by the particular rules engine instance, rather than distributing the rule models approximately evenly across all rules engine instances.

In at least one embodiment of the present disclosure, distribution or re-distribution of the tenants 110 on the rules engine instances 106 based on the in-memory rules engine distribution model can be achieved by changing the assignment of tenants from their corresponding source rules engine instance 106 to a corresponding target rules engine instance 106. For example, changing the assignment of tenant T31 from rules engine instance A 106A to rules engine instance B 106B includes bootstrapping the rules model for tenant T31 on the target instance, in this case rules engine instance B 106B, and then modifying a corresponding entry in a mapping table. The rules model for tenant T31 is then removed from the source instance, in this case rules engine instance A 106A, and the corresponding entry in the mapping table is modified accordingly.

Figure 3:
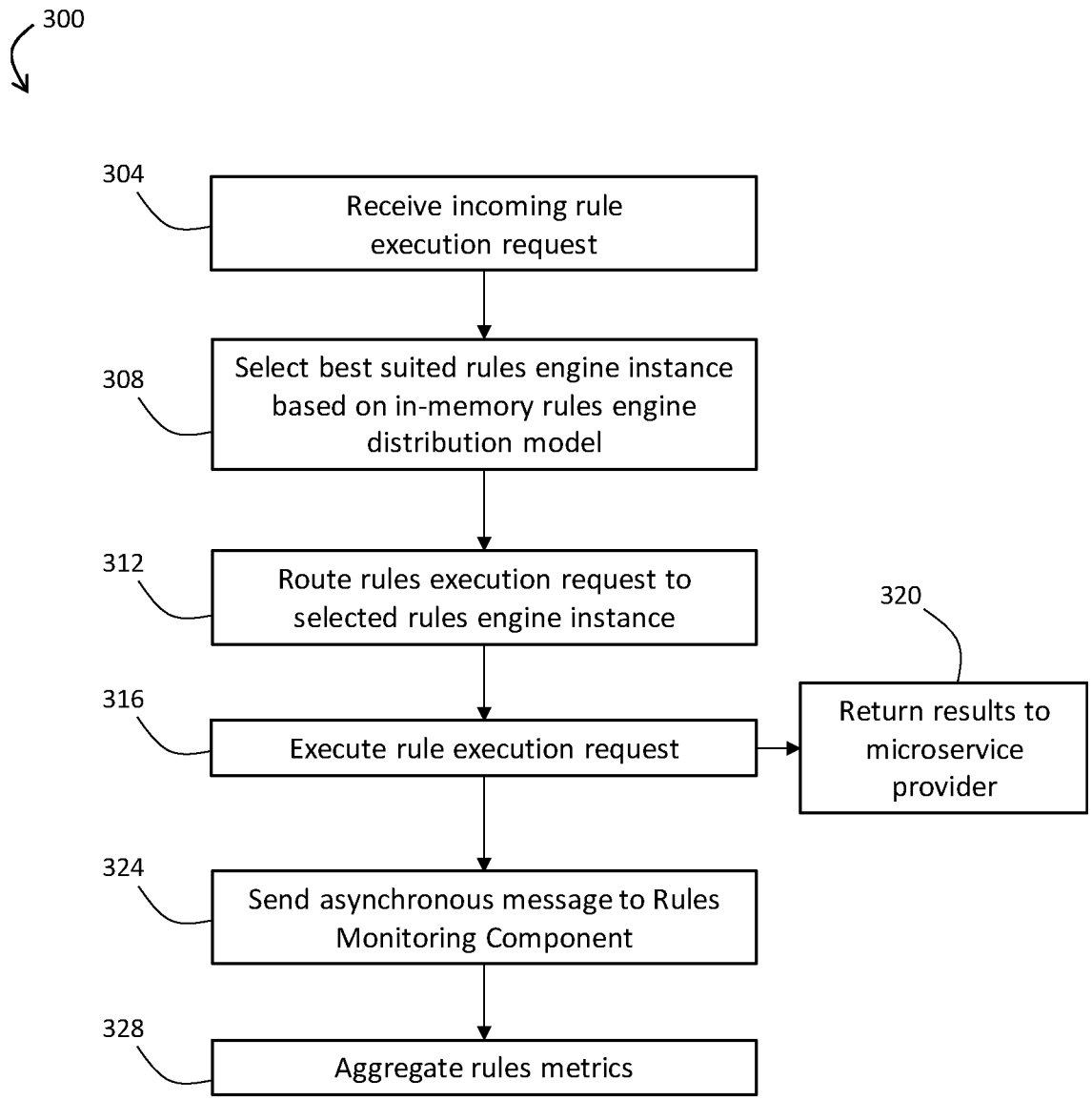
FIG. 3 illustrates a flowchart of an example method for executing rules requests, in accordance with embodiments of the present disclosure

Once the workloads have been distributed across the rules engine instances 106, such as by the method 200 described above, in accordance with some embodiments of the present disclosure, rules requests can be executed according to the method 300 shown in FIG. 3. The method 300 begins at operation 304 wherein an incoming rule execution request from a tenant 110 is received. In at least one embodiment of the present disclosure, the incoming rule execution request is received by the microservice provider 102, and the rules distribution microservice 104 then receives incoming rule execution request from the microservice provider 102.

For illustrative purposes, in one example, a consumer may search a product website for a widget. The tenant T5 is associated with the product website and receives the search results from a search service provider. The tenant T5 then sends those search results, along with a rules execution request, to the microservice provider 102. In this example, at operation 304, the incoming rules execution request is a request for the microservice provider 102 to apply the rules that are specific to tenant T5 to the search results and return a preferred search result presentation to be presented to the consumer.

At operation 308, the best suited rules engine instance 106 for providing a response to the received request is selected based on the in-memory rules engine distribution model discussed above. In at least one embodiment of the present disclosure, the best suited rules engine instance 106 is selected by the rules distribution microservice 104. In at least one embodiment of the present disclosure, the rules distribution microservice 104 analyzes the incoming request and applies the criteria that was used to determine the distribution of the rule sets among the rules engine instances 106 to select the appropriate rules engine instance 106 to which the request is to be sent.

In at least one alternative embodiment of the present disclosure, the best suited rules engine instance 106 can be identified using the mapping table, described above. For example, the best suited rules engine instance 106 can be identified by determining which tenant is associated with the request, looking in the mapping table to identify which rules engine instance 106 is associated with that tenant, and then sending the request to the identified rules engine instance 106.

Continuing with the illustrative example, the rules distribution microservice 104 selects the rules engine instance 106 which has a copy of the tenant-specific rules of the tenant T5. In this example, the rules engine instance A 106A has the copy of the tenant-specific rules of the tenant T5. Therefore, at operation 308, the rules distribution microservice 104 selects the rules engine instance A 106A.

At operation 312, the rules execution request is routed to the selected rules engine instance 106. In at least one embodiment of the present disclosure, the rules execution request is routed by the rules distribution microservice 104. In the illustrative example, the rules execution request from the tenant T5 is routed to the selected rules engine instance 106A. In at least one embodiment of the present disclosure, the search results are sent to the selected rules engine along with the rules execution request.

At operation 316, the rules execution request is executed. In at least one embodiment of the present disclosure, the rules execution request is executed by the designated rules engine instance 106. In the illustrative example, the rules engine instance 106A executes the requested rules execution request by applying the tenant-specific rules for tenant T5 to the provided search results. The tenant-specific rules for tenant T5 may include a rule, for example, that any results within the search results that are within a particular price range are to be ranked in a particular order in the presentation of the search results. The tenant-specific rules for tenant T5 may further include a rule that any results within the particular price range that are available within a specific geographical distance of a particular location are to be ranked in a particular order in the presentation of the search results.

At operation 320, the results of the executed rules execution request are returned to the microservice provider 102. In at least one embodiment of the present disclosure, the results of the executed rules execution request are returned to the microservice provider 102 by the rules engine instance 106 that executed the rules execution request. In the illustrative example, the results of the rules execution request that was executed by rules engine instance 106A are returned to the microservice provider 102. These results include prioritization of the search results according to the two rules discussed above. The microservice provider 102 can then provide these prioritized results to the tenant T5, which can present the prioritized results to the consumer.

At operation 324, an asynchronous message is sent to the rules monitoring component 108. In at least one embodiment of the present disclosure, the asynchronous message is sent by the rules engine instance 106 that executed the rules execution request. In at least one embodiment of the present disclosure, the asynchronous message includes rules metrics or information that is used to determine the rules metrics. In the illustrative example, the asynchronous message is sent by the rules engine instance 106A to the rules monitoring component 108 and includes, without limitation, the number of rules that were applied during the rules execution and the number of conditions or facts that had to be checked in order to execute those rules.

At operation 328, rules metrics pertaining to the executed rules execution request are aggregated. In at least one embodiment of the present disclosure, the rules metrics are aggregated by the rules monitoring component 108. In the illustrative example, the data including the number of rules that were applied during the rules execution and the number of conditions or facts that had to be checked in order to execute those rules is aggregated along with similar data from other rules execution requests received by the microservice provider 102.

These aggregated rules metrics can then be used to re-calculate or update the workloads for each rule model or tenant 110. For example, the data in the aggregated rules metrics can be inputted back into the algorithm provided at operation 208 of method 200. By updating the workloads based on data that is gathered during the operation of the system 100 and feeding those updated workloads back into the in-memory rules engine distribution model, the distribution of rule models among the rules engine instances can be further and repeatedly optimized. For example, in at least one embodiment of the present disclosure, the workloads can be updated based on data from the aggregated rules metrics at regular intervals.

Figure 4:
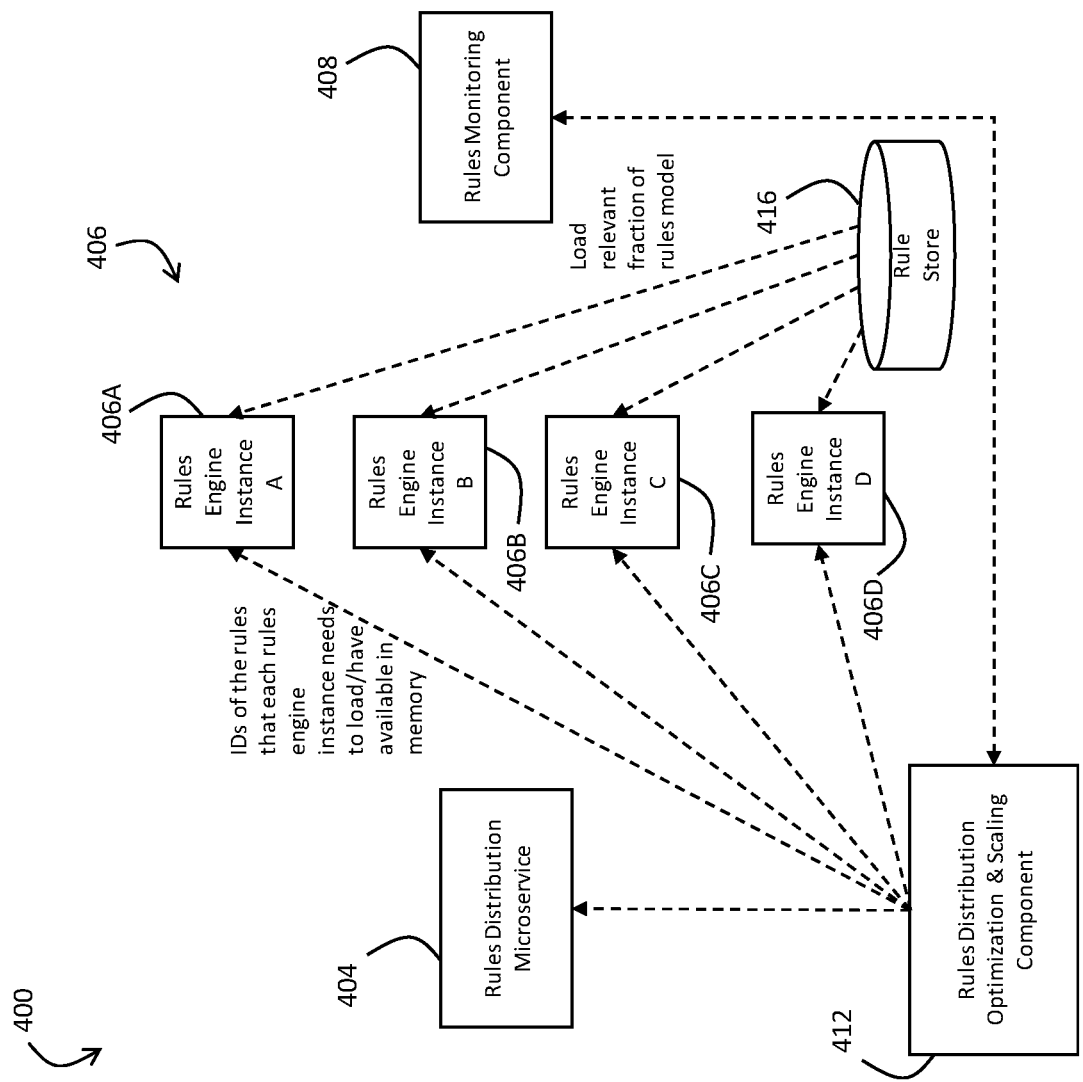
FIG. 4 illustrates a block diagram of an example system for rules distribution optimization and scaling, in accordance with embodiments of the present disclosure.

Once the workloads have been initially distributed across the rules engine instances 106, such as by the method 200 described above, in accordance with some embodiments of the present disclosure, the distribution can be further optimized dynamically over time. Such further rule optimization and scaling can be performed by a system 400 such as that shown in FIG. 4.

More specifically, the system 400 includes: a rules distribution microservice 404 that is substantially similar to the rules distribution microservice 104 described above with reference to FIG. 1; a plurality of rules engine instances 406 that are substantially similar to the rules engine instances 106 described above with reference to FIG. 1; and a rules monitoring component 408 that is substantially similar to the rules monitoring component 108 described above with reference to FIG. 1. The system 400 further includes a rules distribution optimization and scaling component 412 and a rule store 416.

In accordance with at least one embodiment of the present disclosure, the rules distribution optimization and scaling component 412 is configured to request aggregated rules metrics from the rules monitoring component 408. The requests can be sent, for example, at regular temporal intervals. Moreover, the rule monitoring component 408 is configured to return aggregated rules metrics to the rules distribution optimization and scaling component 412. The requested rules metrics can include data regarding which rules are executed by which tenant, memory consumption of each rule, and central processing unit (CPU) consumption of average rule execution. Additionally, the rules distribution and scaling component 412 is communicatively coupled with the rules distribution microservice 404 such that the rules distribution microservice 404 is able to receive updated rule engine distribution models from the rules distribution optimization and scaling component 412. Such updated rule engine distribution models can then be used in subsequent assignment of sets of rules, such as by method 200, and/or subsequent execution of rules requests, such as by method 300.

In accordance with at least one embodiment of the present disclosure, the rule store 416 is configured to store all of the rules of all of the rules models. In other words, the rule store 416 is configured to act as a repository for the rules that are provided to the microservice provider (such as microservice provider 102 shown in FIG. 1) and are distributed among the rules engine instances 406.

Figure 5:
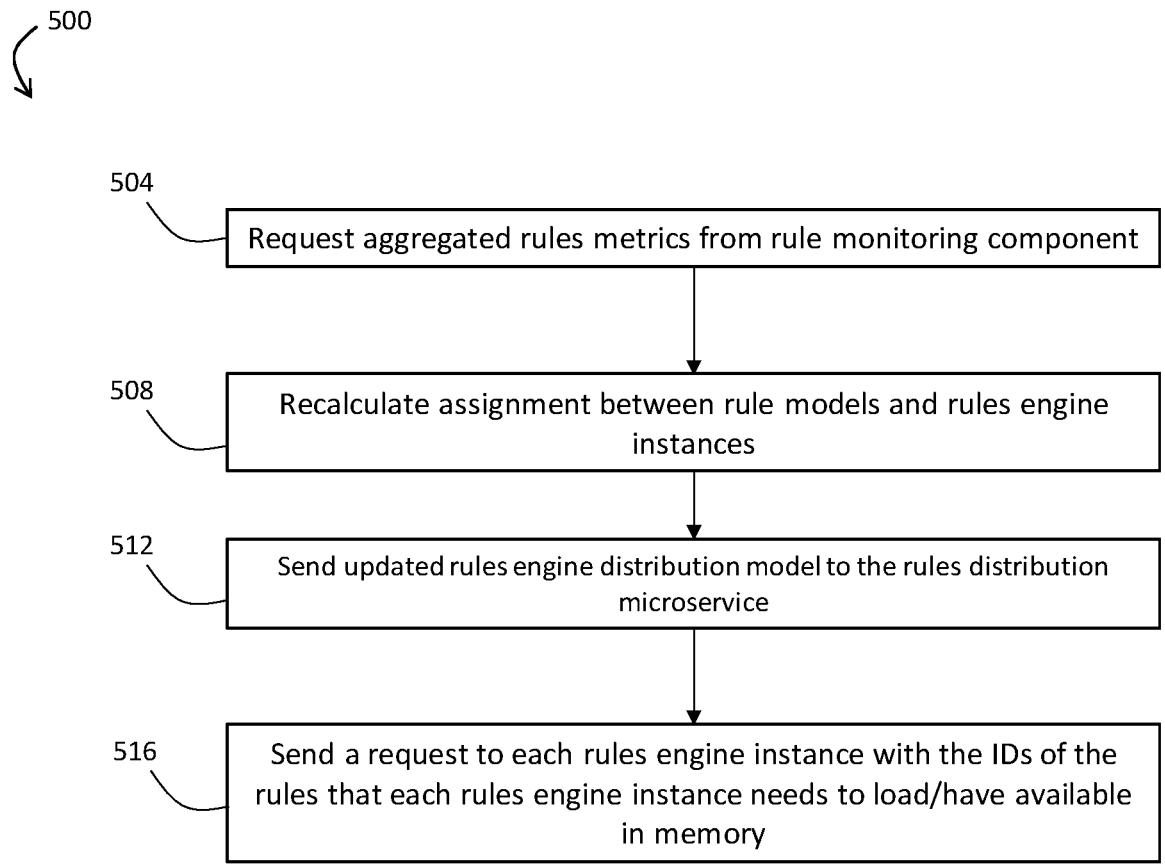
FIG. 5 illustrates a flowchart of an example method for optimizing the distribution of rules models, in accordance with embodiments of the present disclosure.

An example method 500 of further optimization of the distribution of rule models among a set of orchestrated microservice engines is illustrated in FIG. 5. In at least some embodiments of the present disclosure, the method 500 is carried out using the system 400. Method 500 begins with the workloads distributed across the rules engine instances 106, such as by the method 200 described above.

At operation 504, aggregated rules metrics are requested from the rule monitoring component 408. In at least one embodiment of the present disclosure, the rules distribution optimization and scaling component 412 requests the aggregated rules metrics from the rule monitoring component 408. In at least one embodiment of the present disclosure, the rules distribution optimization and scaling component 412 requests the aggregated rules metrics at regular intervals. In particular, the aggregated rules metrics that are requested may include, without limitation: which rules are executed by which tenant; memory consumption of each rule; and CPU consumption of average rule execution.

At operation 508, the assignment between rule models and rules engine instances 406 is recalculated. In at least one embodiment of the present disclosure, the rule models are loaded from the rules store 416. In at least one embodiment of the present disclosure, the rules distribution optimization and scaling component 412 recalculates the assignment between rule models (loaded from the rules store) and rules engine instances 406 to achieve a balanced central processing unit and memory consumption across the rules engine instances 406. In at least one embodiment of the present disclosure, if expected memory and CPU consumption are above an upper predetermined value, then the rules distribution optimization and scaling component 412 instantiates additional rules engine instances 406. However, if the memory and CPU consumption are below a lower predetermined value, then the rules distribution optimization and scaling component 412 shuts down rules engine instances 406 to free system resources.

At operation 512, an updated rules engine distribution model is sent to the rules distribution microservice 404. In at least one embodiment of the present disclosure, the rules distribution optimization and scaling component 412 sends the updated rules engine distribution model to the rules distribution microservice 404.

At operation 516, a request is sent to each rules engine instance 406 with identifications of the corresponding rules that each rules engine instance 406 needs to load and/or have available in memory. In at least one embodiment of the present disclosure, the rules distribution optimization and scaling component 412 sends a request to each rules engine instance 406 with the identifications of the rules that each rules engine instance 406 needs to load and/or have available in memory.

In at least one embodiment of the present disclosure, machine learning can be used to predict rule loads that are expected, per tenant. For example, based on the time of day or another quantitative variable, the rule load of a tenant may fluctuate. These fluctuations may be detected by a time clock or a sensor configured to detect the quantitative variable. Such predictions enable the system to preemptively distribute or re-distribute the rule models in a manner that prevents high loads from reoccurring on particular rules engine instances.

In at least one embodiment of the present disclosure, the execution of rules can be analyzed to identify those that are commonly executed together. This factor can be used in the management of the distribution of rules across rules engine instances.

Figure 6:
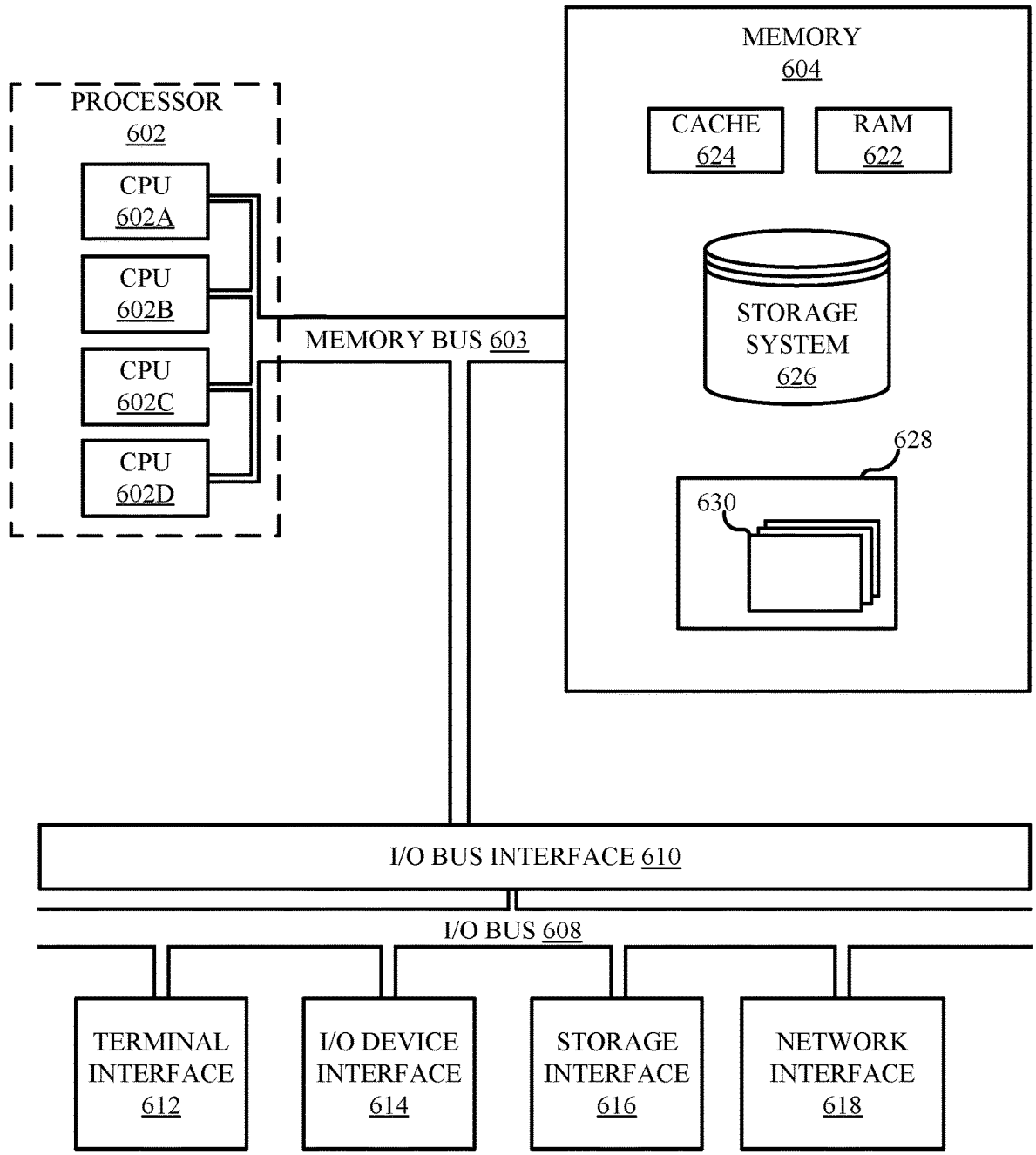
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 1030 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 1030 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
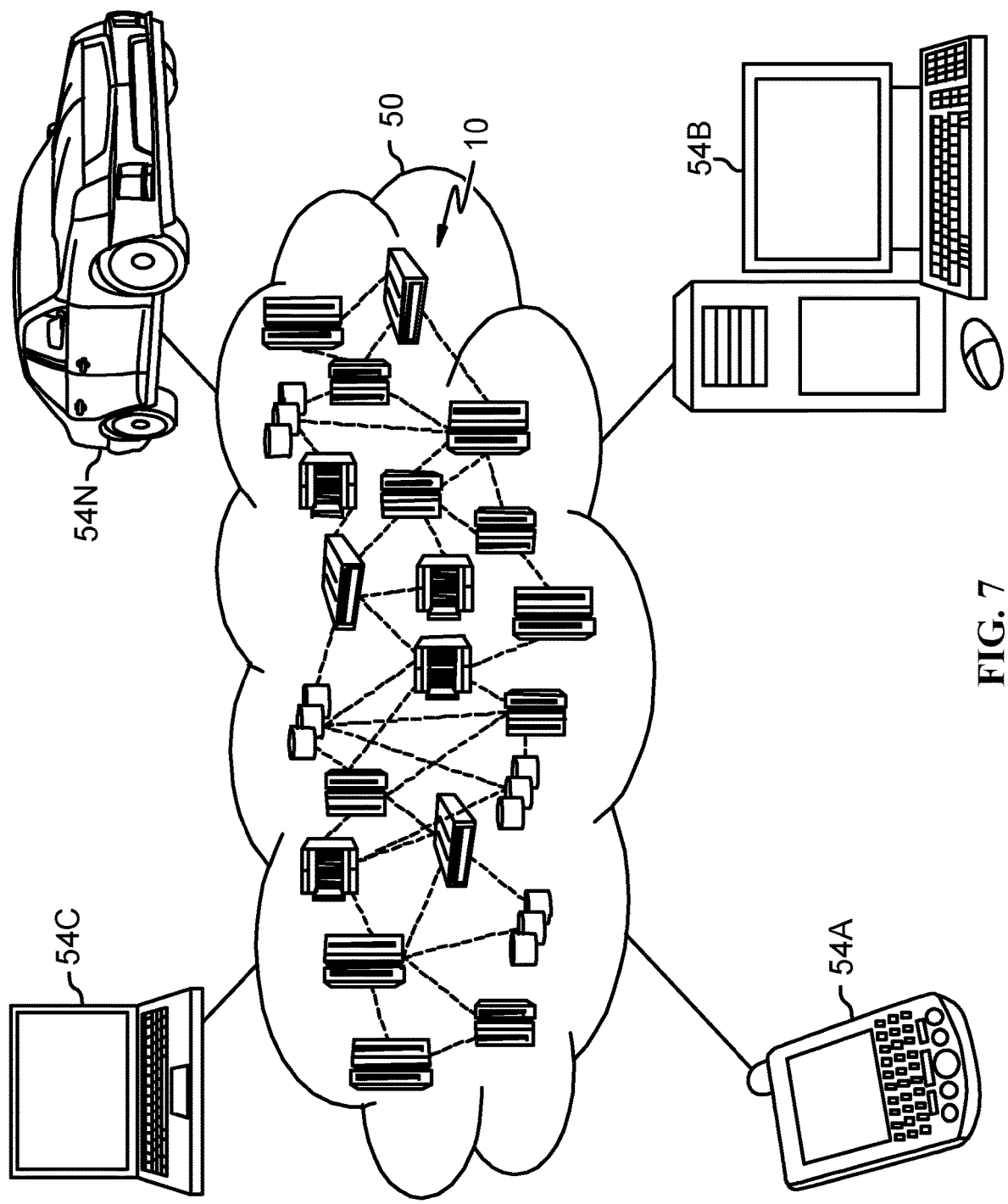
FIG. 7 depicts a cloud computing environment, in accordance with embodiments of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
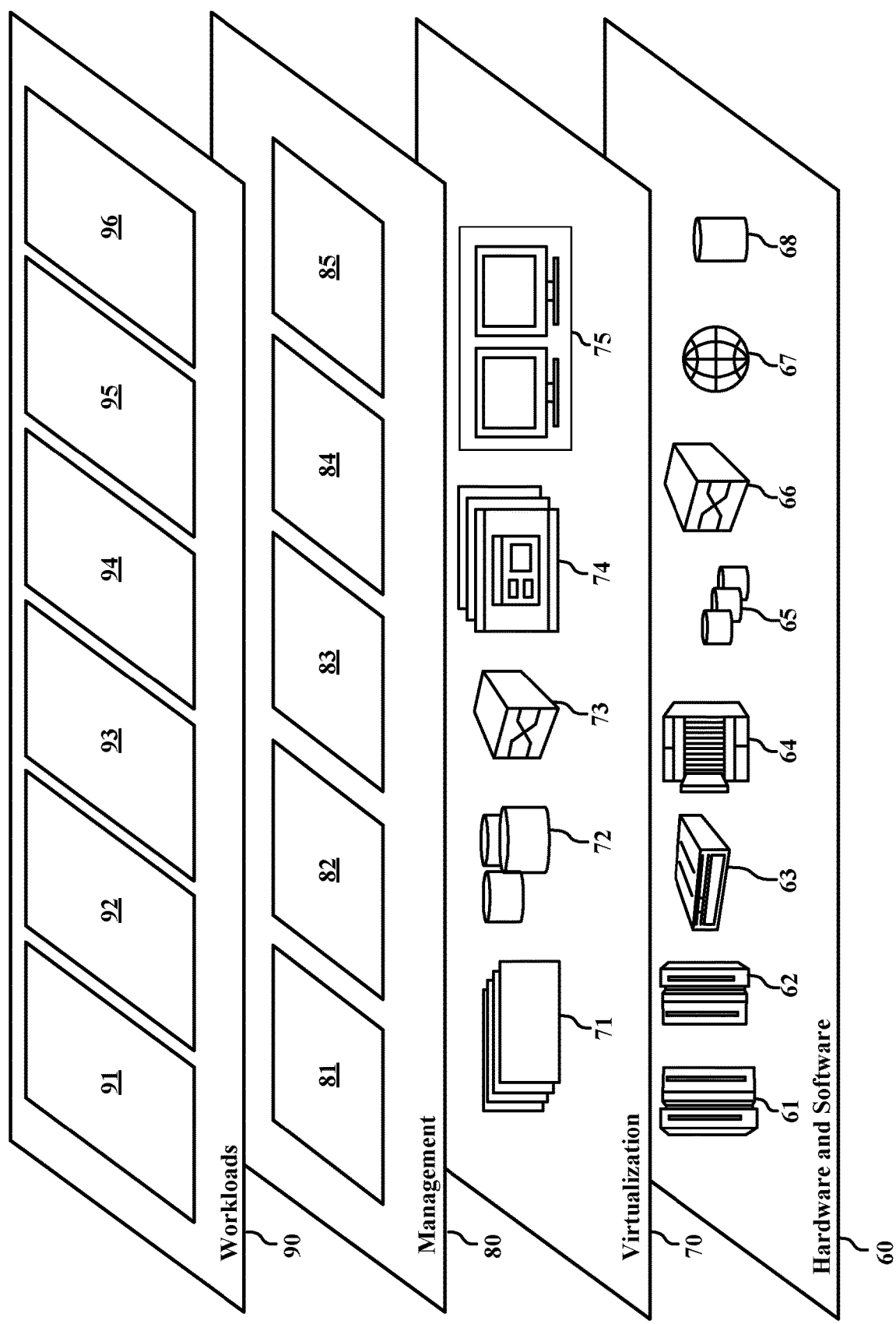
FIG. 8 depicts abstraction model layers, in accordance with embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

In addition to embodiments described above, other embodiments having fewer operational steps, more operational steps, or different operational steps are contemplated.

Also, some embodiments may perform some or all of the above operational steps in a different order. Furthermore, multiple operations may occur at the same time or as an internal part of a larger process. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
   determining a rule load for each set of rules of a plurality of sets of rules, wherein each set of rules is associated with a tenant of a plurality of tenants hosted on a multi-tenant system;
   combining the rule loads into an overall rule load;
   distributing the plurality of sets of rules across a set of rules engine instances such that:
   each rules engine instance is assigned sets of rules corresponding to a subset of tenants of the plurality of tenants, the subset including more than one tenant and fewer than all of the tenants,
   the overall rule load is distributed as evenly as possible across the set of rules engine instances,
   for each set of rules, all rules of that set of rules are assigned to the same rules engine instance, and
   for each rules engine instance, only rules of the sets of rules assigned to that rules engine instance are loaded on that rules engine instance;
   receiving a rules execution request pertaining to a first tenant of the subset of tenants;
   routing the rules execution request to a first rules engine instance of the set of rules engine instances to which the set of rules corresponding to the first tenant has been assigned;
   executing the rules execution request by applying the set of rules corresponding to the first tenant;

determining, at regular temporal intervals, rules metrics of the execution of the at least one rules execution request; and based on the rules metrics, re-distributing the sets of rules across the set of rules engine instances such that the overall rule load is distributed as evenly as possible across the set of rules engine instances.

2. The method of claim 1, wherein the plurality of sets of rules is maintained by a microservice provider.

3. The method of claim 2, wherein the set of rules engine instances is deployed by the microservice provider.

4. The method of claim 1, wherein determining the rule load for each set of rules includes:
determining a number of requests made by the respective tenant; and
determining an average number of actions triggered per request.

5. The method of claim 1, wherein determining the rule load for each set of rules includes:
determining a number of requests made by the respective tenant; and
determining a number of conditions to be considered to answer each request.

6. The method of claim 5, wherein:
the number of requests made by the respective tenant and the number of conditions to be considered to answer each request is sent to a rules monitoring component; and
the rules monitoring component aggregates these numbers for each set of rules.

7. The method of claim 6, wherein:
determining the rules metrics includes obtaining the aggregated numbers from the rules monitoring component.

8. A computer program product comprising a computer readable storage medium having program instructions embodied therewith, the program instructions executable by processor to cause the processor to perform a method comprising:
determining a rule load for each set of rules of a plurality of sets of rules, wherein each set of rules is associated with a tenant of a plurality of tenants hosted on a multi-tenant system;
combining the rule loads into an overall rule load; and
assigning each of the plurality of sets of rules to a rules engine instance of a set of rules engine instances such that:
each rules engine instance is assigned sets of rules corresponding to a subset of tenants of the plurality of tenants, the subset including more than one tenant and fewer than all of the tenants,
the overall rule load is distributed as evenly as possible across the set of rules engine instances,
for each set of rules, all rules of that set of rules are assigned to the same rules engine instance, and
for each rules engine instance, only rules of the sets of rules assigned to that rules engine instance are loaded on that rules engine instance;
receiving a rules execution request pertaining to a first tenant of the subset of tenants;
routing the rules execution request to a first rules engine instance of the set of rules engine instances to which the set of rules corresponding to the first tenant has been assigned; and
executing the rules execution request by applying the set of rules corresponding to the first tenant.

9. The computer program product of claim 8, wherein the plurality of sets of rules is maintained by a microservice provider.

10. The computer program product of claim 9, wherein the set of rules engine instances is deployed by the microservice provider.

11. The computer program product of claim 8, wherein determining the rule load for each set of rules includes:
determining a number of requests made by the respective tenant; and
determining an average number of actions triggered per request.

12. The computer program product of claim 8, wherein determining the rule load for each set of rules includes:
determining a number of requests made by the respective tenant; and
determining a number of conditions to be considered to answer each request.

13. The computer program product of claim 12, wherein:
the number of requests made by the respective tenant and the number of conditions to be considered to answer each request is sent to a rules monitoring component; and
the rules monitoring component aggregates these numbers for each set of rules.

14. The computer program product of claim 13, further comprising:
obtaining the aggregated numbers from the rules monitoring component; and
based on the aggregated numbers, re-distributing the sets of rules across the set of rules engine instances such that the overall rule load is distributed as evenly as possible across the set of rules engine instances.

15. A rules distribution system comprising:
a memory; and
a processor communicatively coupled to the memory, wherein the processor is configured to perform a method comprising:
determining a rule load for each set of rules of a plurality of sets of rules, wherein each set of rules is associated with a tenant of a plurality of tenants hosted on a multi-tenant system;
combining the rule loads into an overall rule load; and
assigning each of the plurality of sets of rules to a rules engine instance of a set of rules engine instances such that:
each rules engine instance is assigned sets of rules corresponding to a subset of tenants of the plurality of tenants, the subset including more than one tenant and fewer than all of the tenants,
the overall rule load is distributed as evenly as possible across the set of rules engine instances,
for each set of rules, all rules of that set of rules are assigned to the same rules engine instance, and
for each rules engine instance, only rules of the sets of rules assigned to that rules engine instance are loaded on that respective rules engine instance;
receiving a rules execution request pertaining to a first tenant of the subset of tenants;
routing the rules execution request to a first rules engine instance of the set of rules engine instances to which the set of rules corresponding to the first tenant has been assigned; and
executing the rules execution request by applying the set of rules corresponding to the first tenant.

16. The system of claim 15, wherein the plurality of sets of rules is maintained by a microservice provider.

17. The system of claim 16, wherein the set of rules engine instances is deployed by the microservice provider.

18. The system of claim 15, wherein determining the rule load for each set of rules includes:
- determining a number of requests made by the respective tenant; and
- determining an average number of actions triggered per request.

19. The system of claim 15, wherein determining the rule load for each set of rules includes:
- determining a number of requests made by the respective tenant; and
- determining a number of conditions to be considered to answer each request.

20. The system of claim 19, further comprising:
- aggregating the number of requests made by the respective tenant and the number of conditions to be considered to answer each request for each set of rules; and
- based on the aggregated numbers, re-distributing the sets of rules across the set of rules engine instances such that the overall rule load is distributed as evenly as possible across the set of rules engine instances.

* * * * *